Patented May 8, 1951

2,552,347

UNITED STATES PATENT OFFICE 2,552,347

HYDROCARBON SYNTHESIS

Marnell A. Segura, Denham Springs, La., assignor to Standard Oil Development Company, a corporation of Delaware No Drawing. Application May 20, 1947, Serial No. 749,335

5 Claims. (Cl. 260—449.6)

This invention relates to the catalytic conversion of carbon oxides with hydrogen to form valuable synthetic products. The invention is more particularly concerned with an improved method and catalyst permitting a retardation or the prevention of the deterioration or disintegration of finely divided catalysts having a high activity and selectivity for the formation of nomally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which can not be readily removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration particularly in fluid operation. The reduction of the true density of the catalyst resulting from its high content of low-density carbon coupled with the rapid disintegration of the catalyst particles causes the fluidized catalyst bed to expand thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

It has been further found that the various representatives of the group of catalysts having carbonization tendencies vary considerably in their performance in fluid operation. Considerable variations have been noted even among such of these catalysts as contain the same catalytically active metal component, particularly among various iron catalysts.

Normally the catalysts exhibiting the most desirable characteristics of high activity and selectivity to liquid products also have the strongest tendency toward carbonization and disintegration. These findings have prompted generalizations to the effect that the higher the activity and liquid product selectivity of a synthesis catalyst the greater ts carbonization and disintegration tendency in fluid operation and vice versa.

It will be appreciated therefore that the reconciliation of high catalyst activity and selectivity with low catalyst carbonization presents a serious and important problem in the hydrocarbon synthesis art. The present invention is chiefly concerned with a solution of this problem.

It is, therefore, the principal object of my invention to provide an improved process for the catalytic conversion of CO and $H_2$.

Another object of my invention is to provide means for improving the operation of the catalytic conversion of CO and $H_2$ employing the fluid solids technique.

A more specific object of my invention is to provide means for reducing the carbonization and disintegration tendencies of certain highly reactive and selective synthesis catalysts used in the catalytic conversion of CO and $H_2$ employing the fluid solids technique.

Other and further objects and advantages will appear hereinafter.

In accordance with the present invention the carbonization tendency of active highly selective and normally strongly carbonizing synthesis catalysts, particularly iron catalysts may be substantially depressed by the addition to such catalysts, of small amounts of vanadium, antimony or manganese. However, vanadium has been found to be distinctly superior to antimony and manganese with respect to the retardation of carbon formation. While these elements effect a substantial reduction of carbon formation and deposition on iron-type catalysts they have no adverse effects on catalyst selectivity toward valuable liquid products and substantially no effect on catalyst activity. The carbon inhibiting agents of the invention may be added in proportions varying from about 2% to about 8% by weight, preferably about 5% to 6% by weight of the active carbonizing catalyst component, such as iron. Conventional catalyst promoters, such as alumina and/or the oxides, carbonates, chlorides, fluorides, etc., of potassium or sodium may be added in amounts of about 0.1–10% by weight of the total catalyst.

Catalysts useful for the purposes of the present invention may be prepared by fusing the metallic or oxidic catalyst components together with the promoter desired and then cooling, sizing and, if desired, reducing the fused mass. Other useful methods of preparing the catalysts of the present invention comprise mixing the powdered catalytically active and carbon-inhibiting components in the metallic or oxidic form, adding the promoter by dry-mixing or impregnation, sintering, sizing, and oxidizing and/or reducing the catalyst mass; or the powdered active catalyst component in the metallic or oxidic form may be impregnated with suitable salts of the carbon-inhibiting and promoting components, such as aqueous solutions of the chlorides of vanadium, manganese or antimony and of the carbonates, hydroxides, chlorides or fluorides of potassium or sodium, dried, sintered, sized and oxidized and/or reduced prior to use.

Suitable methods of catalyst preparation will be illustrated by the following specific examples.

EXAMPLE I

Sintered pyrites ash having the composition given below was used as an iron source.

*Analysis of sintered pyrites ash*

| Element: | Per cent |
|---|---|
| Iron | 67.3 |
| Copper | 0.13 |
| Sulfur | 0.01 |
| Silica ($SiO_2$) | 1.50 |
| Zinc | 0.17 |
| Manganese | 0.13 |
| Phosphorus | 0.0038 |
| Alumina ($Al_2O_3$) | 0.53 |
| Calcium | 0.80 |
| Magnesium | 0.27 |
| Oxygen | 27.0 |
| Nickel Oxide (NiO) | 0.09 |

367 grams of this sintered pyrites ash were mixed with 20.8 grams of manganese dioxide, 8.3 grams of alumina ($Al_2O_3$), and 4.0 grams of potassium carbonate and the mixture was fused in an Ajax Induction furnace at about 2500° F. The melt was poured out into a $KA_2S$ tray and allowed to cool. The cooled material was then ground and sized to 6–8 mesh.

EXAMPLE II 382 grams of sintered pyrites ash of the composition specified in Example I was fused in an Ajax furnace at a temperature of about 2500° F. and 24.5 grams of $V_2O_5$ was added to the molten mass. The melt was poured into a fire clay crucible to cool and then sized by grinding and screening to a particle size of 6–8 mesh. The sized catalyst was reduced with 1000 volumes of hydrogen per volume of catalyst per hour at a temperature of about 900° F.

EXAMPLE III

*By impregnation*

A vanadium-containing catalyst may be prepared by the impregnation method as follows:

94 grams of carboynl iron powder is thoroughly wetted with 20 cc. of an aqueous solution of potassium carbonate containing one gram of $K_2CO_3$. After thorough mixing the material is dried at 105° C. for a period of 12 hours. The dried material is reimpregnated with a solution of vanadium dichloride containing an equivalent of 5 grams of vanadium in 50 cc. of water. After thoroughly mixing the impregnated material is dried at 105° C. for 12 hours, and then fused in an Ajax furnace at about 2500° F. The melt is poured into a clay crucible, allowed to cool, and then ground and sized.

EXAMPLE IV 92.5 grams of finely divided iron metal obtained by thermal decomposition of iron carbonyl was intimately mixed with 5 grams of powdered vanadium metal. The mixture was moistened and thoroughly mixed with 75 cc. of an aqueous solution containing 12.5 grams of potassium fluoride. The mixture was dried, fused with an oxygen-methane torch at a temperature of about 3000° F., allowed to cool and broken up into lumps of about 6–8 mesh size.

EXAMPLE V

A catalyst was prepared substantially as outlined in Example IV except that no vanadium was added to the iron powder.

Catalysts prepared in accordance with Examples IV and V were tested in a fixed bed laboratory unit at the conditions and with the results set forth in the example given below:

EXAMPLE VI

Operating Conditions:
```
 Temperature, °F-------------------------------- 600
 Pressure, lbs./sq. in. gauge-------------------- 250
 H2:CO Feed ratio----------------------------- 1.2:1
 Throughput, v./v./ hr-------------------------- 200
```

| Results | Catalyst | |
|---|---|---|
| | Example IV | Example V |
| CO-conversion, Per Cent Output Basis | 94 | 94 |
| Oil collected, cc./m.³ $H_2$+CO Fed | 114 | 127 |
| $C_4$+, cc./m³ $H_2$+CO Consumed | 195 | 196 |
| Unextractable Carbon on Catalyst After 163 Hours of Use, Per Cent by Weight | 1.25 | 1.83 |

The results of Example VI demonstrate that the addition of vanadium in accordance with the present invention substantially reduces carbon formation without adversely affecting the activity as measured by the CO conversion and the selectivity of the iron catalyst toward the formation of valuable liquid products as measured by the $C_4$+ yield.

It is noted however, that the vanadium content of the catalyst should not substantially exceed about 8% by weight, since it has been demonstrated by other experiments that catalyst activity steadily decreases as the vanadium content is raised beyond this upper limit.

The addition of manganese or antimony to iron catalysts of the type specified in the above example likewise affords a substantial reduction of unextractable carbon on the catalyst. The carbon content of such catalysts at the conditions of Example VI may fall somewhere between the values of 1.25 and 1.83 shown in Example VI for vanadium-containing catalyst and catalyst free of carbon-inhibiting metals, respectively.

Similar beneficial results may be obtained with the catalysts of the invention when sized to a fluidizable size and used in fluid catalyst operation, the reduced carbon formation resulting in a correspondingly reduced catalysts disintegration and thus in a considerable improvement of fluidization and temperature control as well as in catalyst life.

While the foregoing description and exemplary operations have served to illustrate specific applications and results of the present invention, other modifications obvious to those skilled in the art are within the scope of the invention. Only such limitations should be imposed on the invention as are indicated in the appended claims.

I claim:

1. An improved process for producing valuable conversion products from CO and $H_2$ in the presence of iron catalysts which comprises contacting a gas containing CO and $H_2$ in synthesis proportions at synthesis conditions with a catalyst consisting essentially of a major proportion of iron, about 2–8% by weight of vanadium, and a minor proportion of an alkali metal compound selected from the group consisting of the oxides, carbonates, chlorides, and fluorides of sodium and potassium and promoting the selectivity of the catalyst toward the formation of normally liquid hydrocarbons.

2. The process of claim 1 wherein said catalyst has a fluidizable particle size and said gas is contacted with said catalyst in the form of a dense turbulent mass of catalyst particles fluidized by said gas and by upwardly flowing volatile reaction products.

3. The process of claim 1 in which said catalyst is prepared by forming an intimate mixture of said iron, said vanadium and said compound and sizing said mixture.

4. The process of claim 1 in which said catalyst contains about 92.5% by weight of carbonyl iron, about 5% by weight of vanadium metal and about 2.5% by weight of potassium fluoride.

5. The process of claim 4 in which said catalyst is prepared by impregnating a mixture of powdered iron and powdered vanadium metal with a solution of potassium fluoride, drying, fusing, cooling and sizing the mixture.

MARNELL A. SEGURA.

REFERENCES CITED

The following references are of record in the file of this patent:

UNITED STATES PATENTS

| Number | Name | Date |
|---|---|---|
| 989,755 | Bedford et al. | Apr. 18, 1911 |
| 1,211,394 | Bosch et al. | Jan. 9, 1917 |
| 2,254,806 | Michael | Sept. 2, 1941 |
| 2,287,891 | Linckh | June 30, 1942 |
| 2,414,276 | Sensel et al. | Jan. 14, 1947 |
| 2,433,072 | Stewart et al. | Dec. 23, 1947 |
| 2,433,255 | Atwell | Dec. 23, 1947 |
| 2,438,449 | Mosesman | Mar. 23, 1948 |
| 2,446,426 | Layng | Aug. 3, 1948 |
| 2,472,219 | Lyons | June 7, 1949 |

FOREIGN PATENTS

| Number | Country | Date |
|---|---|---|
| 293,185 | Great Britain | July 5, 1928 |

OTHER REFERENCES

Audibert et al.: "Action of Iron Catalysts . . . Hydrogen." Ind. Eng. Chem., vol. 21, No. 9, pages 880–885 (Sept. 1929), 6 pages, page 881 contains the disclosure relied upon.